(12) United States Patent
Pora et al.

(10) Patent No.: US 8,843,952 B2
(45) Date of Patent: Sep. 23, 2014

(54) DETERMINING TV PROGRAM INFORMATION BASED ON ANALYSIS OF AUDIO FINGERPRINTS

(75) Inventors: Mihai Pora, Krakow (PL); Zbigniew Skolicki, Krakow (PL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/536,756

(22) Filed: Jun. 28, 2012

(65) Prior Publication Data

US 2014/0007152 A1 Jan. 2, 2014

(51) Int. Cl.
*H04N 21/4415* (2011.01)

(52) U.S. Cl.
USPC .......... 725/18; 382/240; 348/553; 707/104.1; 726/32

(58) Field of Classification Search
None
See application file for complete search history.

(56) References Cited

U.S. PATENT DOCUMENTS

| | | | |
|---|---|---|---|
| 4,677,466 A | 6/1987 | Lert, Jr. et al. | |
| 4,697,209 A | 9/1987 | Kiewit et al. | |
| 7,613,691 B2 * | 11/2009 | Finch | 1/1 |
| 7,809,154 B2 | 10/2010 | Lienhart et al. | |
| 7,873,974 B2 | 1/2011 | Da Costa | |
| 8,094,872 B1 | 1/2012 | Yagnik et al. | |
| 8,411,977 B1 * | 4/2013 | Baluja et al. | 382/240 |
| 8,488,836 B2 | 7/2013 | Brunk et al. | |
| 2006/0123455 A1 * | 6/2006 | Pai et al. | 725/133 |
| 2007/0130580 A1 * | 6/2007 | Covell et al. | 725/18 |
| 2008/0082510 A1 * | 4/2008 | Wang et al. | 707/3 |
| 2008/0244676 A1 | 10/2008 | DaCosta | |
| 2008/0309819 A1 * | 12/2008 | Hardacker et al. | 348/553 |
| 2009/0031326 A1 * | 1/2009 | Wold | 719/318 |
| 2009/0041418 A1 | 2/2009 | Candelore et al. | |
| 2010/0305729 A1 | 12/2010 | Glitsch et al. | |
| 2011/0173208 A1 * | 7/2011 | Vogel | 707/746 |
| 2011/0247042 A1 * | 10/2011 | Mallinson | 725/86 |
| 2011/0289121 A1 * | 11/2011 | Pirkner | 707/805 |
| 2013/0160038 A1 | 6/2013 | Slaney et al. | |

FOREIGN PATENT DOCUMENTS

| | | |
|---|---|---|
| EP | 1653381 A2 | 5/2006 |
| EP | 2388721 A1 | 11/2011 |

OTHER PUBLICATIONS

Google Inc., International Search Report and Written Opinion, PCT/US2013/048328, Dec. 2, 2013, 18 pgs.
Google Inc., Invitation to Pay Additional Fees, PCT/US2013/048328, Sep. 23, 2013, 5 pgs.

* cited by examiner

*Primary Examiner* — Joshua Taylor
*Assistant Examiner* — Adil Ocak
(74) *Attorney, Agent, or Firm* — Morgan, Lewis & Bockius LLP

(57) ABSTRACT

A computer-implemented method for clustering audio fingerprints from different set top boxes into groups based on their similarities is disclosed. The computer server receives audio fingerprints generated at different set top boxes and partitions them into multiple groups such that audio fingerprints within a group correspond to a respective TV program being played at the respective set top boxes. Upon receipt of an audio fingerprint from a set top box, the computer server identifies a group of audio fingerprints that are substantially similar to the audio fingerprint, determines TV program information for the audio fingerprint in accordance with the channel metadata associated with the identified group of audio fingerprints, and returns the TV program information to the requesting set top box.

26 Claims, 11 Drawing Sheets

| TV Viewership History Record 340 |
|---|
| Rcord ID 342 |
| Start Time 344 |
| End Time 346 |
| Fingerprint(s) 348 |
| TV Program Information 350 |
| Channel Number 352 |
| Program Name 354 |
| ... |

FIG. 3C

| TV Content Provider Record 320 |
|---|
| Content Provider ID 322 |
| Broadcast Schedule 324 |
| Channel Line-up Data 326 |
| ... |

FIG. 3B

| STB Fingerprint Record 300 |
|---|
| STB ID 302 (optional) |
| Report Timestamp 304 |
| Fingerprint 306 |
| Video Scene Transition Type 308 (Optional) |
| Channel Metadata 310 (Optional) |
| Channel Lineup ID 312 |
| Channel Number 314 |
| Channel Name 316 |

FIG. 3A

DETERMINING TV PROGRAM INFORMATION BASED ON ANALYSIS OF AUDIO FINGERPRINTS

RELATED APPLICATIONS

This application relates to U.S. patent application Ser. No. 13/536,779, "Generating a sequence of audio fingerprints at a set top box," (060963-5780-US) filed on Jun. 28, 2012, which is hereby incorporated by reference in its entirety.

TECHNICAL FIELD

The disclosed implementations relate generally to TV broadcasting, and in particular, to system and method for determining the programs being played at a television through audio/video signal recognition.

BACKGROUND

Nowadays, people can get the same TV content from different vendors through different communication channels, such as satellite, cable, phone line, and Internet. The choice of communication channels often has many geographic and demographic considerations. For example, satellite receivers may be the most commonly used devices for households in the rural areas to receive TV signals. But it is probably more common for households in big metropolitan areas to use cable connections or over the air (OTA) antennas to receive TV signals. Although many people still watch TV programs on TVs, younger viewers may increasingly choose to watch TV programs on a computer that is coupled to the Internet, or even a smartphone supporting 3G/4G wireless communications. The existence of diversified communication channels for receiving TV programs is that it is more challenging to provide an efficient, accurate estimate of the viewership rating for a particular TV program at a large population level (e.g., at a national level).

SUMMARY

In accordance with some implementations described below, a method for grouping audio fingerprints by their associated TV programs and determining the corresponding TV program information for each group of audio fingerprints is implemented at a computer server system including one or more processors and memory. The method includes: receiving information from a plurality of set top boxes, wherein the information includes audio fingerprints generated at the plurality of set top boxes and channel metadata associated with at least a subset of the audio fingerprints; partitioning the audio fingerprints into multiple groups such that audio fingerprints within a group correspond to a respective TV program being played at the respective set top boxes; receiving a query for TV program information from a set top box, wherein the query includes an audio fingerprint generated at the set top box; comparing the audio fingerprint with the multiple groups of audio fingerprints to identify a group of audio fingerprints that are substantially similar to the audio fingerprint; determining TV program information for the audio fingerprint in accordance with, at least in part, the channel metadata associated with the identified group of audio fingerprints; and returning the TV program information to the requesting set top box.

In accordance with some implementations described below, a computer system for determining TV program information includes one or more processors, memory, and a plurality of program modules stored in the memory. The plurality of program modules include instructions for receiving information from a plurality of set top boxes, wherein the information includes audio fingerprints generated at the plurality of set top boxes and channel metadata associated with at least a subset of the audio fingerprints; partitioning the audio fingerprints into multiple groups such that audio fingerprints within a group correspond to a respective TV program being played at the respective set top boxes; receiving a query for TV program information from a set top box, wherein the query includes an audio fingerprint generated at the set top box; comparing the audio fingerprint with the multiple groups of audio fingerprints to identify a group of audio fingerprints that are substantially similar to the audio fingerprint; determining TV program information for the audio fingerprint in accordance with, at least in part, the channel metadata associated with the identified group of audio fingerprints; and returning the TV program information to the requesting set top box.

In accordance with some implementations described below, a non-transitory computer readable-storage medium stores one or more programs for execution by one or more processors of a computer system for determining TV program information. The one or more programs include instructions for receiving information from a plurality of set top boxes, wherein the information includes audio fingerprints generated at the plurality of set top boxes and channel metadata associated with at least a subset of the audio fingerprints; partitioning the audio fingerprints into multiple groups such that audio fingerprints within a group correspond to a respective TV program being played at the respective set top boxes; receiving a query for TV program information from a set top box, wherein the query includes an audio fingerprint generated at the set top box; comparing the audio fingerprint with the multiple groups of audio fingerprints to identify a group of audio fingerprints that are substantially similar to the audio fingerprint; determining TV program information for the audio fingerprint in accordance with, at least in part, the channel metadata associated with the identified group of audio fingerprints; and returning the TV program information to the requesting set top box.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIG. 3A is a block diagram illustrating a data structure used by the set top box or the TV content recognition server for managing an audio fingerprint and associated channel metadata in accordance with some implementations.

FIG. 3B is a block diagram illustrating a data structure used by the TV content recognition server for organizing TV content schedule and channel line-up data from a TV content provider in accordance with some implementations.

FIG. 3C is a block diagrams illustrating a data structure used by the set top box for storing the TV viewing history associated with the set top box in accordance with some implementations.

DETAILED DESCRIPTION

TV viewership in national markets can be quite fragmented. In some implementations, a TV viewership projection system receives raw viewership data from a variety of TV content providers (e.g., cable and satellite companies, over-the-air broadcasters and Internet streaming sites). The TV viewership projection system aggregates the raw data from each of the different content providers for different geodemographic groups (i.e., particular viewer demographics, geographic regions, and/or some combination of both characteristics) and computes viewership share information for particular groups at a level that is statistically significant. For example, the TV viewership projection system computes per-minute share information when there is enough data (e.g., in metropolitan areas), and per-hour share information when there is not enough data to reliably determine per-minute share information (e.g., in sparsely populated areas where there are few subscribers for a particular service/content provider). The TV viewership projection system then combines the share information from disparate content providers by weighting the different components in order to produce reliable share information for larger areas than covered by the information from the disparate providers. In some situations, the viewership share information covers the same geodemographic groups (e.g., viewership information for the same geographical regions from a satellite provider and a cable provider). Also, by combining and weighting viewership share information for different content providers, it becomes possible to generate reliable information for geodemographic groups that are not adequately represented in either group individually (e.g., share information for a cable provider A and a satellite provide B might not include adequate information for the same geo-demographic group X individually, but when combined they do).

Figure 1A:
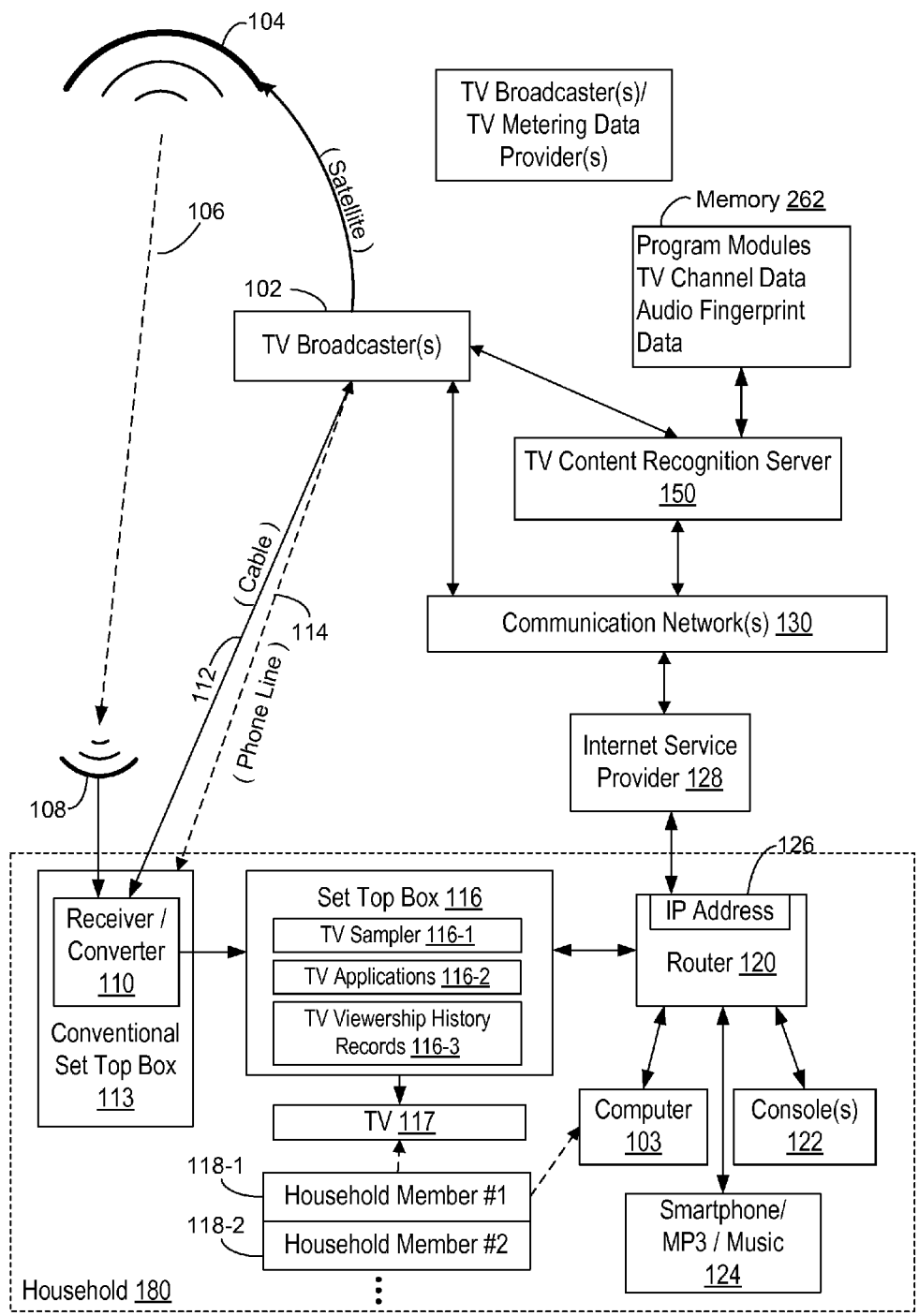
FIGS. 1A and 1B are two block diagrams, each illustrating a distributed TV content delivery system including a plurality of communication channels for delivering TV signals to a household and a TV content recognition server in accordance with some implementations.

FIG. 1A is a block diagram illustrating a distributed TV content delivery system including a plurality of communication channels for delivering TV signals to a household and a TV content recognition server 150 in accordance with some implementations. In some implementations, one or more TV broadcasters 102 each have their own TV program information, including but not limited to, program broadcasting schedules, program descriptions, and channel line-ups. The TV broadcasters 102 may transmit the television programs to the household 180 over a cable 112, over the air, by transmission from a satellite 104, or by streaming over the communication networks 130 (e.g., Internet). In the case of satellite transmissions 106, the household 180 has a receiver antenna 108 to receive the signal. In the household 180 there is a conventional set top box (STB) 113 that includes a receiver or converter 110 to process or decode the incoming TV signals. The conventional STB 113 is typically provided by a TV broadcaster 102 when the household 180 signs a contract with the TV broadcaster 102. In some implementations, there is an additional communication channel between the TV broadcaster 102 and the conventional STB 113 over a telephone line 114. The conventional STB 113 may provide information about what television programs are being viewed, or may receive further information from the TV broadcaster 102 for interactive television programs. In this case, the conventional STB 113 is typically a two-way set top box provided by the TV broadcaster 102 and the information is usually not available to a third-party TV viewership rating agency (e.g., information about the household member's TV viewing activities may have been encrypted).

The actual television program signals are generally transmitted by satellite 104, over a cable 112, or via terrestrial TV transmissions (i.e., conventional TV broadcast). In some implementations, the television programs are streamed over the communications network 130, such as the Internet. In these implementations, the process of selecting a television program may be performed by a computer 103, a STB 116, or the conventional STB 113 that is connected directly to the household router 120 (not shown in FIG. 1A). As will be described in detail below, the STB 116 is a device that is configured to generate audio fingerprints. The household router 120 is the gateway to the Internet from the household 180. Inside the household 180, the router 120 is connected to the STB 116, and in some cases to a number of computers 103, smartphones or digital audio players 124, or game consoles 122, such as XBOX, PLAYSTATION or WII. The router 120 is connected to the communication network 130 through an Internet service provider 128 that assigns the IP address 126 to the home router 120.

Figure 1B:
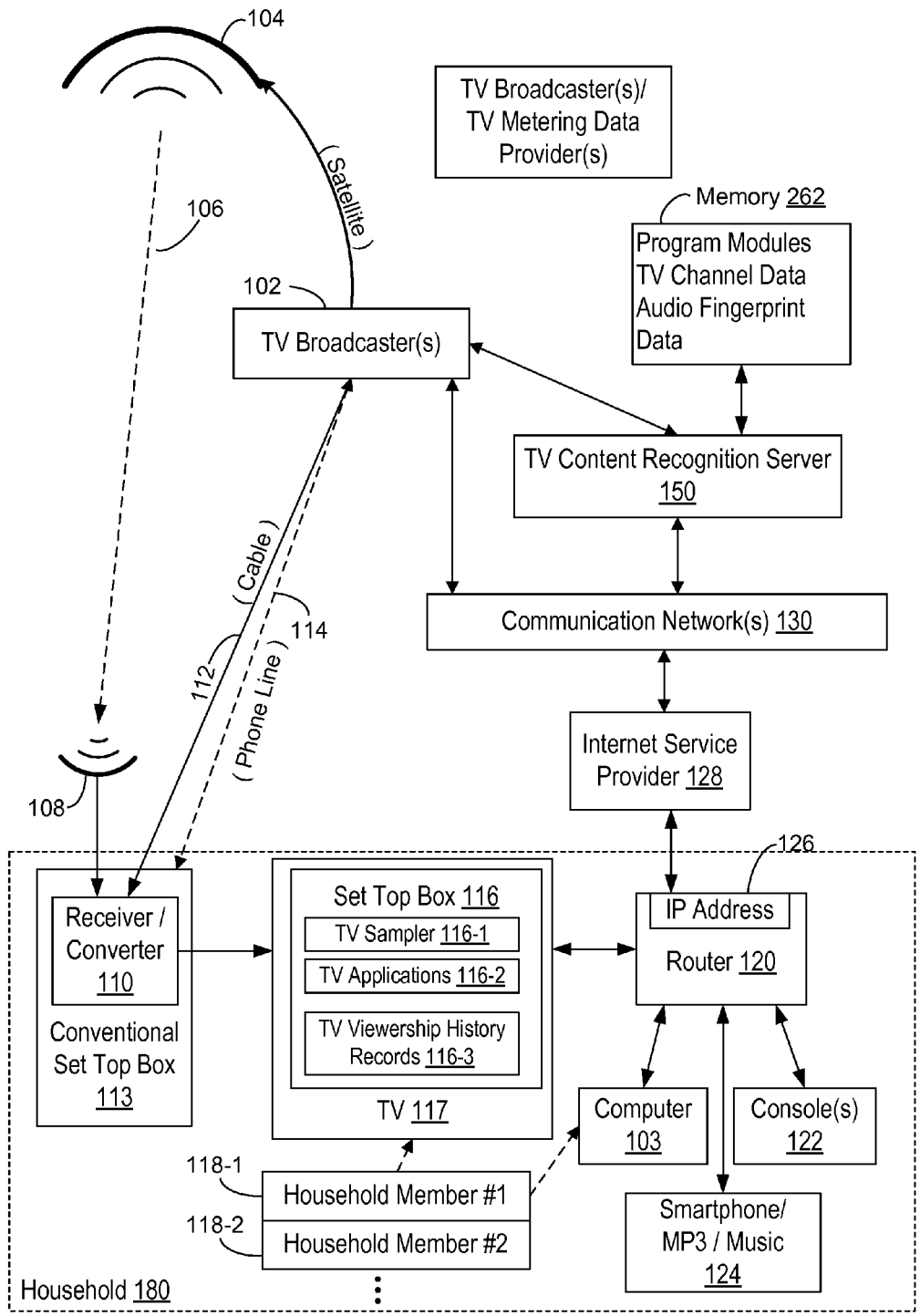

The decoded TV signals, regardless of how they arrive at the household 180, are transmitted to the STB 116, which is communicatively coupled to a television 117 through a cable (e.g., HDMI) and allows household members 118 to control what is being played on the television 117. In some implementations, as shown in FIG. 1B, the STB 116 is integrated into the television 117. For illustrative purposes, the following description of the present application focuses on the implementation shown in FIG. 1A. But one skilled in the art would understand that the description below also applies to the implementation shown in FIG. 1B. In general, a household member, such as member 118-1 or 118-2 controls the STB 116 with a remote control device.

In some implementations, the STB 116 shown in FIG. 1A is provided by a third party (e.g., a TV viewership rating agency) that is not affiliated with the TV broadcaster 102. In this case, the STB 116 is typically a one-way set top box and it may not have access to the program information that is controlled by the TV broadcaster 102 and have to find out the household members' TV viewing activities through other approaches. For example, the STB 116 is connected to the TV content recognition server vial the communication network 130 (e.g., the Internet) through a wired or wireless home router 120. As will be described below, the TV sampler 116-1 in the STB 116 collects samples of the program viewed by the household members and transmits the samples (e.g., audio or video or both) to the TV content recognition server 150 via the household router 120. In some implementations, the TV sampler 116-1 converts each collected sample into an audio fingerprint record that has a predefined data structure and uniquely identifies a particular audio segment of the program. In some implementations, because the audio fingerprint record is transmitted through the household router 120, the IP address 126 of the household router 120 is also transmitted to the TV content recognition server 150 along with the audio fingerprint record. Using the IP address 126, the TV content recognition server 150 can uniquely identify the source of each audio fingerprint record it receives.

In some implementations, the IP address 126 and/or the audio fingerprint record is transmitted to the TV content recognition server 150 on a periodic basis (e.g., once every one to ten minutes). In some other implementations, the TV sampler 116-1 also generates an audio fingerprint record whenever it detects a predefined type of video scene transition in the TV program (e.g., a predefined amount of increase or decrease of luminosity in the video signal) and includes the video scene transition type into the audio fingerprint record to be sent to the TV content recognition server 150.

The TV content recognition server 150 receives the audio fingerprint records from multiple households, each household having a STB 116 for generating audio fingerprints. By comparing the audio fingerprints from different STBs 116, the TV content recognition server 150 can group the audio fingerprints that correspond to the same TV program together. By doing so, the TV content recognition server 150 can determine the number of households that watch a particular TV program at the same time and the identities of these households (e.g., through the IP address 126 of each household). In some implementations, at least some of the STBs can provide not only the audio fingerprints of a TV program being played on a TV but also additional information about the TV program (e.g., title, broadcasting channel and schedule, TV broadcaster, etc.). Using the additional information, the TV content recognition server 150 can further determine what TV program is being played at a TV within a particular household for a given time period based on the audio fingerprints generated by the STB 116 within the household.

In some implementations, a STB 116 in the household 180 can access the TV content recognition server 150 to determine the TV viewing activities in the household 180 by submitting an audio fingerprint to the TV content recognition server 150. In response, the TV content recognition server 150 matches the audio fingerprint to a group of similar audio fingerprints collected from different STBs and then returns the TV program information associated with the group of audio fingerprints. Using the TV program information, the STB 116 can generate a new TV viewership history record 116-3, which indicates what TV program was played on the TV 117 at a particular moment.

In some implementations, the households 180 for which the TV viewership information is determined by the TV content recognition server 150 are participants in TV viewership panels who have agreed that their TV viewing, account and demographic information can be collected, aggregated and analyzed to determine personalized TV viewing data for participant households 180. In some implementations, information associated with a particular household member is filtered out from the TV viewership information before any entity (e.g., a TV viewership survey agency) can access the TV viewership information.

In some cases, the household 180 has a fixed IP address 126, in which case the fixed IP address 126 is associated with the household's account in the database 132. In some other cases, the household 180 has a dynamically-allocated IP address, which can change on a regular basis (e.g., every time a household member "dials up," or makes a new connection to, the Internet service provider 128 (ISP)). In this case, the TV content recognition server 150 tracks the changes to the household's IP address 126 accordingly. In yet some other cases, the TV content recognition server 150 does not keep track of the origins of the audio fingerprints but only the audio fingerprints themselves for grouping. In some cases, each household has an associated account profile, including a unique profile identifier, one or more demographic parameters that characterize the members of the household including, but not limited to, the number of household members and the age, gender, educational level, income, and profession of at least one household member, and the TV viewership data that represents the television viewing activity of the household 180. For example, the TV viewing activity can include information on every program viewed by the household, including, for each program, a name and description of the program, the channel that played the program, the date/time of the viewing, etc.

Figure 2A:
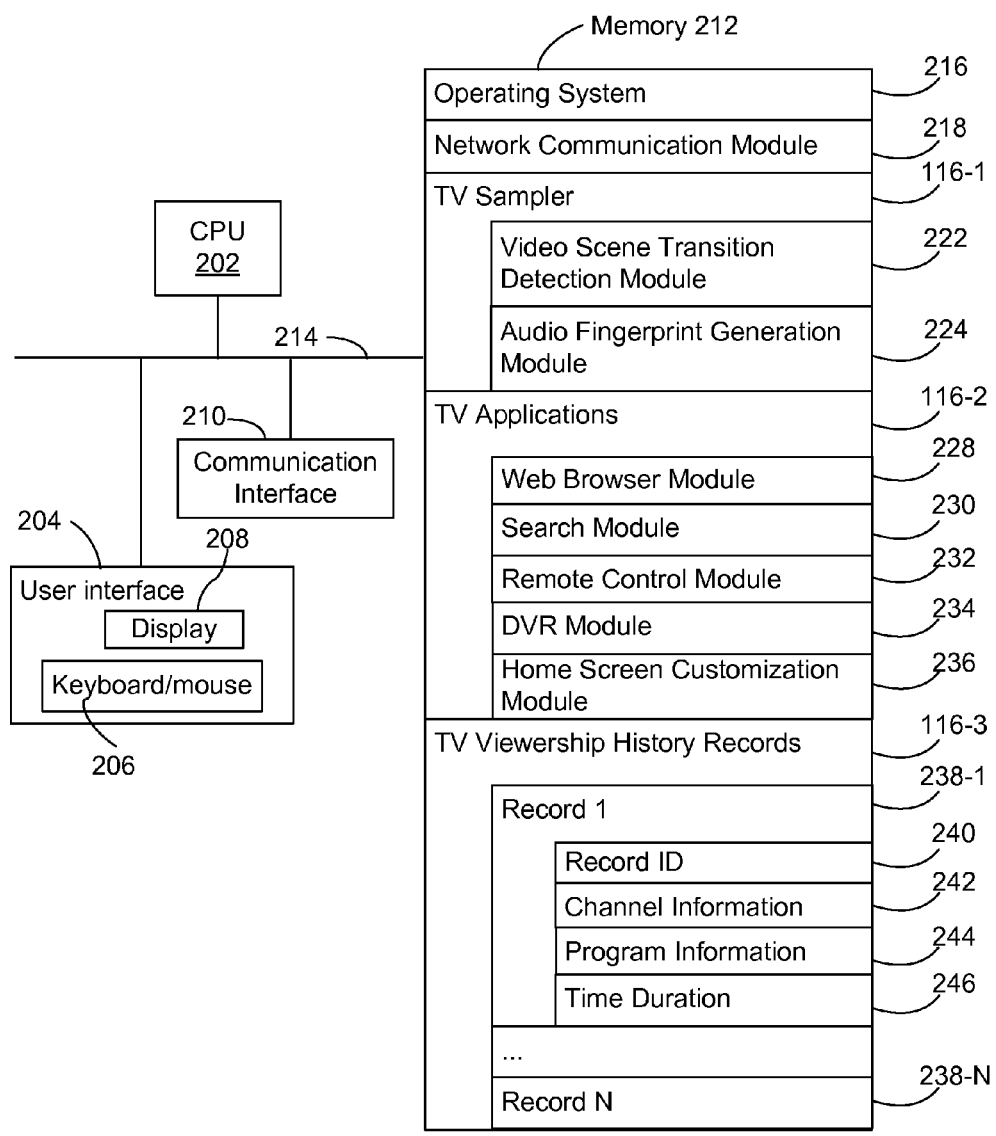
FIG. 2A is a block diagram illustrating the components of the set top box for collecting TV video/audio samples and providing services based on these samples in accordance with some implementations.

FIG. 2A is a block diagram illustrating the components of the STB 116 for collecting TV video/audio samples and providing services based on these samples in accordance with some implementations. The STB 116 includes one or more processing units (CPU's) 202 for executing modules, programs and/or instructions stored in the memory 212 and thereby performing processing operations; one or more network or other communications interfaces 210; memory 212; and one or more communication buses 214 for interconnecting these components. In some implementations, the STB 116 includes a user interface 204 comprising a display device 208 (which could be the TV 117) and one or more input devices 206 (e.g., keyboard or mouse or remote control). In some implementations, the memory 212 includes high-speed random access memory, such as DRAM, SRAM, DDR RAM or other random access solid state memory devices. In some implementations, memory 212 includes non-volatile memory, such as one or more magnetic disk storage devices, optical disk storage devices, flash memory devices, or other non-volatile solid state storage devices. In some implementations, memory 212 includes one or more storage devices remotely located from the CPU(s) 202. Memory 212, or alternately the non-volatile memory device(s) within memory 212, comprises a non-transitory computer readable storage medium. In some implementations, memory 212 or the computer readable storage medium of memory 212 stores the following elements, or a subset of these elements, and may also include additional elements:

- an operating system 216 that includes procedures for handling various basic system services and for performing hardware dependent tasks;
- a network communications module 218 that is used for connecting the STB 116 to other devices (e.g., the TV content recognition server 150) via the communication network interfaces 210 and one or more communication networks (wired or wireless), such as the Internet, other wide area networks, local area networks, metropolitan area networks, and so on;

a TV sampler 116-1 for sampling TV signals and providing information about the sampled TV signals to the TV content recognition server 150;

one or more TV applications 116-2 for providing TV-related services to an end user; and one or more TV viewership history records 116-3 for storing the data about the household's TV viewing activities.

In some implementations, the TV sampler 116-1 may further include the following elements:

a video scene transition detection module 222 for detecting a predefined change of the video signal (e.g., an increase or decrease of average luminosity or a TV channel switch); and an audio fingerprint generation module 224 for generating an audio fingerprint from a segment of audio signal.

In some implementations, the TV applications 116-2 may further include the following elements:

a web browser module 228 for browsing the Internet;

a search module 230 for submitting search queries to the TV content recognition server 150;

a remote control module 232 for receiving user instructions from a remote control device;

a DVR module 234 for performing the digital video recording of TV signals in accordance with the user instructions; and a home screen customization module 236 for customizing the home screen on the TV 117 in accordance with the user instructions.

In some implementations, a TV viewership history record 238 may further include the following elements:

a record ID 240 for identifying the TV viewership history record;

channel information 242 for identifying the TV channel that was broadcasting the TV signal;

program information 244 for describing the TV program being played by the TV channel (e.g., title, program rating, program length, program synopsis, etc.); and time duration 246 during which the TV program was broadcast in the household.

Figure 2B:
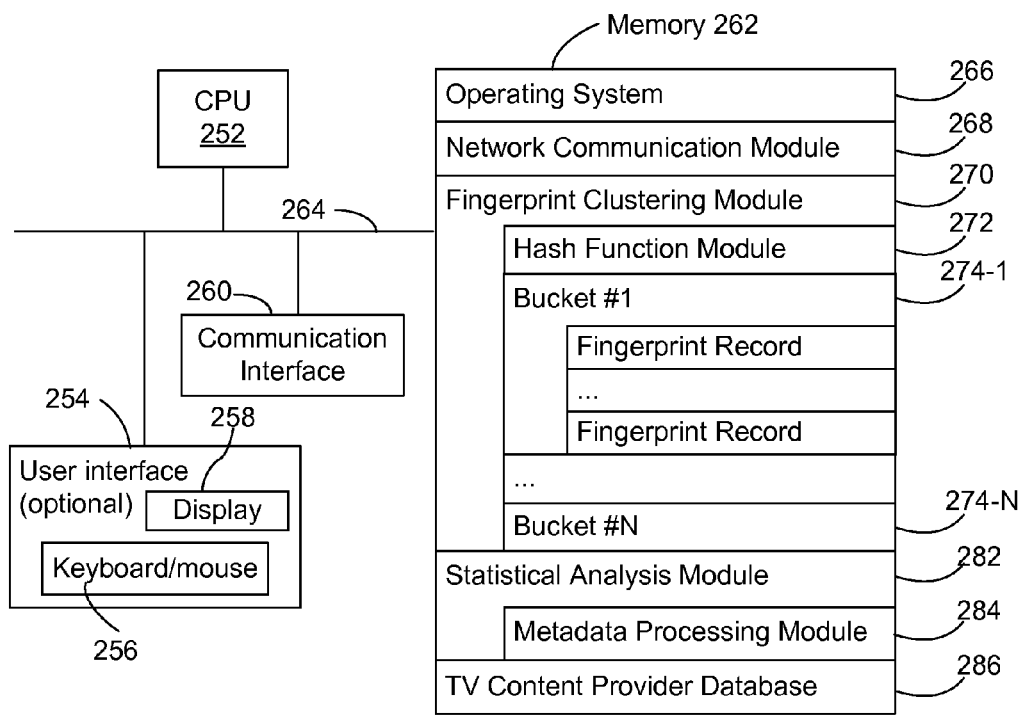
FIG. 2B is a block diagram illustrating the components of the TV content recognition server for grouping audio fingerprints and determining the corresponding TV programs in accordance with some implementations.

FIG. 2B is a block diagram illustrating the components of the TV content recognition server 150 for grouping audio fingerprints and determining the corresponding TV program information in accordance with some implementations. The TV content recognition server 150 includes one or more processing units (CPU's) 252 for executing modules, programs and/or instructions stored in the memory 262 and thereby performing processing operations; one or more network or other communications interfaces 260; memory 262; and one or more communication buses 264 for interconnecting these components. In some implementations, the TV content recognition server 150 includes an optional user interface 254 comprising a display device 258 and one or more input devices 256. In some implementations, the memory 262 includes high-speed random access memory, such as DRAM, SRAM, DDR RAM or other random access solid state memory devices. In some implementations, memory 262 includes non-volatile memory, such as one or more magnetic disk storage devices, optical disk storage devices, flash memory devices, or other non-volatile solid state storage devices. In some implementations, memory 262 includes one or more storage devices remotely located from the CPU(s) 252. Memory 262, or alternately the non-volatile memory device(s) within memory 262, comprises a non-transitory computer readable storage medium. In some implementations, memory 262 or the computer readable storage medium of memory 262 stores the following elements, or a subset of these elements, and may also include additional elements:

an operating system 266 that includes procedures for handling various basic system services and for performing hardware dependent tasks;

a network communications module 268 that is used for connecting the TV content recognition server 150 to other devices (e.g., the STB 116) via the communication network interfaces 260 and one or more communication networks (wired or wireless), such as the Internet, other wide area networks, local area networks, metropolitan area networks, and so on;

a fingerprint clustering module 270 for grouping audio fingerprints submitted by different STBs based on their similarities, the fingerprint clustering module 270 including a hash function module 272 for processing each fingerprint record and determining a respective bucket (274-1 to 274-N) for hosting the fingerprint record;

a statistical analysis module 282 for performing statistical analysis of the fingerprint records in each bucket, the statistical analysis module 282 including a metadata processing module 284 for determining the TV program information associated with the bucket of fingerprint records; and a TV content provider database 286 for storing the data from different TV content providers, e.g., the electronic program guide (EPG).

In some implementations, the TV content recognition server 150 splits an audio fingerprint into multiple sub-fingerprints and associates each sub-fingerprint with a set of channel metadata (which is identified by a metadata ID). For each newly-arrived audio fingerprint, the TV content recognition server 150 conducts a table lookup to determine how many existing sub-fingerprints match this audio fingerprint and then dynamically create a set of sub-fingerprint-to-metadata entries for this audio fingerprint. In other words, the TV content recognition server 150 uses the sub-fingerprint-to-metadata entries as an index to group together similar audio fingerprints.

Figure 2C:
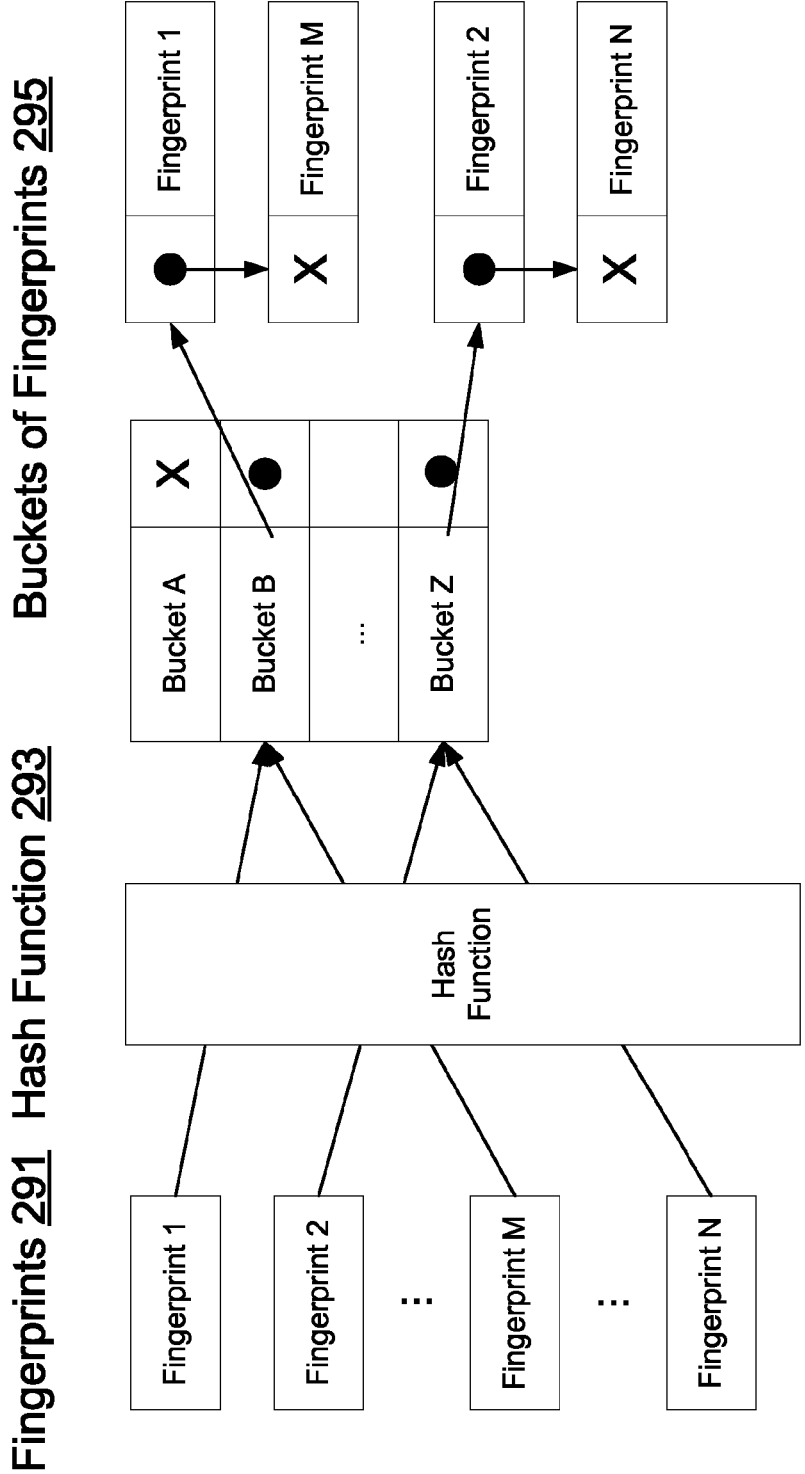
FIG. 2C is a block diagram illustrating how audio fingerprints are grouped into different buckets of a hash table in accordance with some implementations.

FIG. 2C is a block diagram illustrating how audio fingerprints are grouped into different buckets of a hash table in accordance with some implementations. As noted above in connection with FIG. 2B, the TV content recognition server 150 includes a fingerprint clustering module 270 for grouping audio fingerprints submitted by different STBs based on their similarities into multiple buckets. In this implementation, the audio fingerprints 291 are submitted by different STBs from different households. For each audio fingerprint, the fingerprint clustering module 270 applies the fingerprint as a key to a predefined hash function 293. For each key, the hash function 293 determines a value, which corresponds to a bucket of fingerprints 295, and adds the fingerprint to the bucket of fingerprints. As shown in FIG. 2C, each bucket of fingerprints 295 is represented by a linked list and a newly added fingerprint is appended to the end of the linked list. In some implementations, each bucket of audio fingerprints has an associated timestamp or a pair of timestamps, indicating that they were generated near the moment defined by the timestamp or within the time interval defined by the pair of timestamps.

FIG. 3A is a block diagram illustrating a data structure used by the STB 116 or the TV content recognition server 150 for managing an audio fingerprint record and associated channel metadata in accordance with some implementations. The STB fingerprint record 300 includes: an optional STB ID 302 for uniquely identifying a set top box in a particular household, a report timestamp 304 that indicates when the STB 116 generates the audio fingerprint or when the TV content recognition server 150 receives the record, a fingerprint 306 that is typically an alphanumerical string derived from a segment of TV audio signal, and an optional video scene transition type 308 associated with the segment of TV audio signal. As noted above, the video scene transition type 308 provides the context in which the audio fingerprint 306 is generated if the audio fingerprint 306 is not generated periodically. This attribute is used for "synchronizing" different STBs that might not have the same clock time by causing the audio fingerprints from different STBs but corresponding to the same TV program to fall into the same bucket.

In some implementations, some of the STB fingerprint records 300 also include channel metadata 310 associated with the TV programs being played by the corresponding STBs. The channel metadata 310 may include a channel lineup ID 312, a channel number 314, and a channel name 316. The channel lineup ID 312 is provided by a TV content provider for uniquely identifying a set of TV channels associated with a TV program package. For example, a TV content provider may offer multiple TV program packages that have different sets of channels to serve different types of TV viewers. In this case, each package has a unique channel lineup ID 312. Within a TV program package, each channel is assigned a channel number and a channel name for broadcasting a particular set of TV programs. Therefore, based on the channel lineup ID 312, the channel number 314, and/or the channel name 316, the TV content recognition server 150 can uniquely determine what TV program is being broadcast by the channel in accordance with the TV program schedule data stored in the TV content provider database 286. By collecting the channel metadata 310 from a set of STBs, the TV content provider 150 is able to determine what TV program a particular STB (which cannot provide its own channel metadata) is broadcasting based on the similarities between the audio fingerprints provided by the particular STB and the audio fingerprints provided by the set of STBs that also submit their channel metadata.

FIG. 3B is a block diagram illustrating a data structure used by the TV content recognition server 150 for organizing TV content schedule and channel line-up data from a TV content provider in accordance with some implementations. As shown in the figure, each TV content provider record 320 includes a content provider ID 322 for uniquely identifying the TV content provider, a broadcast schedule 324 and the channel line-up data 326 associated with the TV content provider. In some implementations, a TV content provider publishes its broadcast schedule and channel line-up data on its website and updates the broadcast schedule regularly. The TV content recognition server 150 can visit the website and retrieve the information to update the corresponding record 320 in the TV content provider database 286. In some other implementations, the TV content recognition server 150 can receive the broadcast schedule and the channel line-up data from the TV content provider via email subscription.

FIG. 3C is a block diagrams illustrating a data structure used by the STB 116 for storing the TV viewing history associated with the STB 116 in accordance with some implementations. The TV viewership history record 340 includes a record ID 342, a time 344 of starting a TV program on the STB 116, a time 346 of ending the TV program on the STB 116 (or a time duration of playing the TV program), one or more audio fingerprints 348 associated with the TV program, and the TV program information 350 including a channel number 352 on which the TV program is played and a name 354 of the TV program. The TV viewership history record 340 is available not only for the household members to find out what TV programs have been watched by the household members for a given time period but also for another party (e.g., a TV viewership rating agency) to measure the ratings of a particular TV program among a predefined population segment within a predefine geographical region.

Figure 4A:
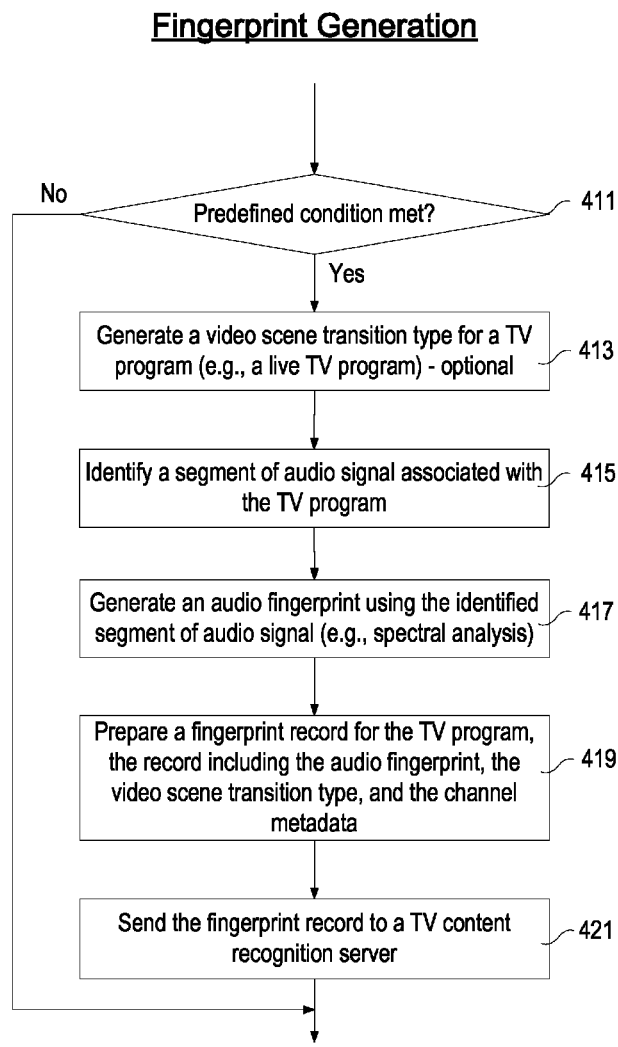
FIG. 4A is a flow chart illustrating how the set top box generates audio fingerprints from a TV program being broadcasted by the set top box in accordance with some implementations.

FIG. 4A is a flow chart illustrating how the STB 116 generates audio fingerprints from a TV program being broadcast by the STB 116 in accordance with some implementations. At the outset, the STB 116 checks (411) whether a predefined condition is met. As noted above, the predefined condition may be the detection of a predefined video scene transition or the termination of a predefined time interval (e.g., if the audio fingerprint is generated periodically). If the predefined condition is not met (411, no), the STB 116 skips the rest of the process. Otherwise (411, yes), the STB 116 generates (413) a video scene transition type for the TV program (e.g., a live TV program). Note that this step (413) may be skipped if the video scene transition type is not used for synchronizing the audio fingerprints from different STBs at the TV content recognition server 150. Upon detecting the predefined video scene transition type, the TV content recognition server 150 identifies a segment of audio signal associated with the TV program (415). In some implementations, the STB 116 caches a predefined length (e.g., one minute) of the audio signal of the TV program being broadcast in its memory. After detecting a predefined condition, e.g., the appearance of a white screen or a dark screen or a predefined change of the luminosity of the TV program's video signal, the STB 116 identifies, e.g., a 10-second segment of the cached audio signal that is close to the video scene transition in time. If there are two video scene transitions within, e.g., 10 seconds, there may be overlap between the two audio segments used for generating the audio fingerprints. Note that the video scene transition may occur before, after or during the play of the identified audio signal segment.

Next, the STB 116 generates (417) an audio fingerprint using the identified audio signal segment. An audio fingerprint is analogous to a human fingerprint where small variations that are insignificant to the features characterizing the fingerprint are tolerated or ignored. In some implementations, the audio fingerprint is a numerical representation (e.g., a vector) of the audio signal segment including a plurality of attributes, such as average zero crossing rate, estimated tempo, average spectrum, spectral flatness, prominent tones across a set of bands, and bandwidth. Many of these attributes can be determined through a frequency-domain spectral analysis of the audio signal segment. Compared with the audio signal itself, the audio fingerprint focuses more on the perceptual characteristics of the audio signal. For example, if two audio signals sound alike to the human ear, their audio fingerprints should match, even if their binary representations are different. In some implementations, the difference between two audio fingerprints is measured by a distance between two corresponding feature vectors, and not a straight binary match that is more sensitive to small but often insignificant changes from the perception of the human ear. In some implementations, the spectral analysis of the audio signal is performed in a 10-second time window to make sure that there is enough variation in audio signal within the time window.

After generating the audio fingerprint, the STB 116 prepares (419) an audio fingerprint record (e.g., the one shown in FIG. 3A). Besides the audio fingerprint, the record may include the corresponding video scene transition type and, optionally, the channel metadata associated with the TV program. As will be described below in connection with FIG. 4C below, the channel metadata provided by one set top box may be used for determining the TV program that is being played at another set top box if the two submit the same or similar audio fingerprints to the TV content recognition server 150. Finally, the STB 116 sends (421) the audio fingerprint record to the TV content recognition server 150. Upon receipt of the audio fingerprint record, the TV content recognition server 150 is responsible for adding to the record to a bucket of records that include the same or similar audio fingerprints.

Figure 4B:
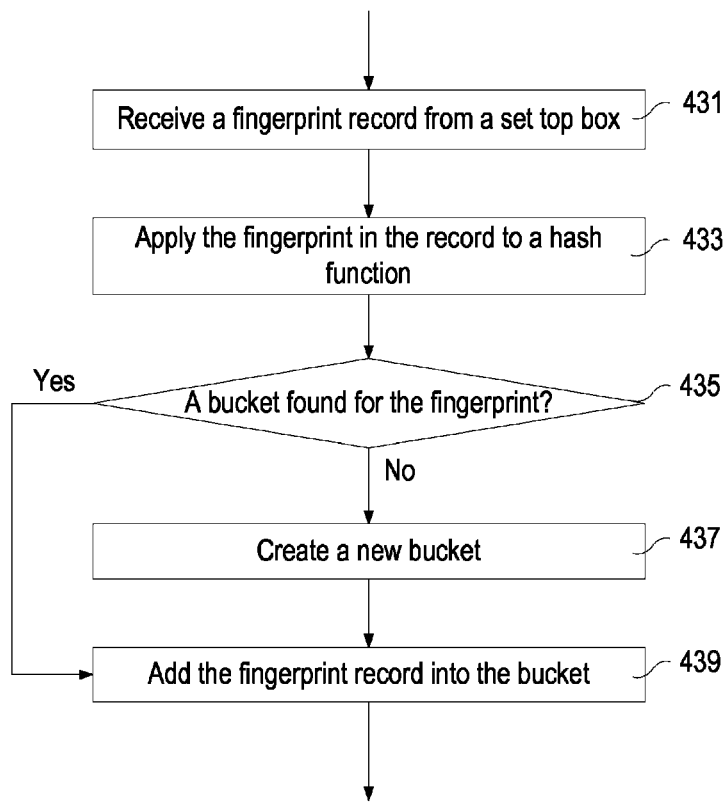
FIG. 4B is a flow chart illustrating how the TV content recognition server groups the audio fingerprints through clustering in accordance with some implementations.

FIG. 4B audio fingerprint record is a flow chart illustrating how the TV content recognition server 150 groups the audio fingerprints through clustering in accordance with some implementations. After receiving (431) an audio fingerprint record from a particular set top box, the STB 116 applies (433) the audio fingerprint in the record to a predefined hash function. In some implementations, the TV content recognition server 150 keeps a buffer of audio fingerprints so that the late-arrival audio fingerprints can be matched against the earlier ones. An audio fingerprint is defined as a vector and the hash function is to measure a distance between the incoming audio fingerprint vector and the center of a cluster of audio fingerprint vectors in an existing bucket. If the distance is less than a predefined threshold, the incoming audio fingerprint is deemed to be the same as or similar to the other audio fingerprints in the bucket and the bucket is identified for hosting the audio fingerprint (435-yes). In some other implementations, as noted above, the TV content recognition server 150 splits an audio fingerprint into multiple sub-fingerprints such that each sub-fingerprint acts like a hash function and the similarity between two audio fingerprints is determined based on the number of sub-fingerprints shared by the two audio fingerprints. In either case, the TV content recognition server 150 adds (439) the new audio fingerprint record to the bucket. If no bucket is found (435-no), the TV content recognition server 150 may create a new bucket (437) and add (439) the record to the newly-created bucket if the incoming audio fingerprint is the first one that arrives at the TV content recognition server 150 and corresponds to a TV program that is being played at a set top box. In some implementations, the TV content recognition server 150 also implements a timeout mechanism for the buckets. For example, if no new fingerprints are added to a bucket for a predefined amount of time, the TV content recognition server 150 will discard the bucket and reclaim the resource occupied by the bucket for other use.

In some implementations, the video scene transition type associated with the incoming audio fingerprint is used to further ensure that the audio fingerprint matches the bucket of audio fingerprints that are derived from the same TV program. For example, if the incoming audio fingerprint falls within a predefined distance from two buckets of audio fingerprints, the TV content recognition server 150 will compare the video scene transition type associated with the incoming audio fingerprint with the video scene transition type associated with the two buckets of audio fingerprints to eliminate at least one bucket that does not have the same video scene transition type. In some implementations, the TV content recognition server 150 compares different video scene transitions, which may correspond to a viewer switch to a different TV channel in one case and a viewer watching the same TV channel all the time in some other cases.

In some implementations, the TV content recognition server 150 compares a sequence of video scene transitions associated with multiple audio fingerprint records from the same STB 116 with the buckets of audio fingerprints to further improve the accuracy of audio fingerprint clustering. For example, if the video scene transition types of three consecutive incoming audio fingerprints are black, black, and white, respectively, the TV content recognition server 150 will not add the three audio fingerprints to three buckets of audio fingerprints whose video scene transition types are black, white, and white, even if the other criteria for audio fingerprint matching have been met. Note that the "black" and "white" are exemplary video scene transitions that may be defined based on a change of average luminosity (e.g. significantly increasing/decreasing, introducing some levels etc.).

In some implementations, the TV content recognition server 150 maintains a limit on the size of the hash table by dynamically eliminating those buckets of audio fingerprint records if they fall outside a moving time window (e.g., a 10-minute time window). If a bucket does not receive any new audio fingerprints for a predefined time, the TV content recognition server 150 may reclaim the memory occupied by the bucket. Therefore, it is possible that a new audio fingerprint corresponding to the same TV program may fall into a newly-created bucket. But it is not possible that there are two co-existing buckets that store the audio fingerprints corresponding to the same video scene transition type. For example, the TV content recognition server 150 is responsible for monitoring the viewership rating of a live TV program. In this case, a search query from a particular set top box that is playing the same TV program live should include an audio fingerprint generated within the time window and can be matched to one of the buckets in the hash table. In contrast, a search query from a particular set top box that is playing a time-shifted version of the TV program may not be matched to any of the buckets in the hash table if the time-shifted audio fingerprint is outside the moving time window managed by the hash table.

Figure 4C:
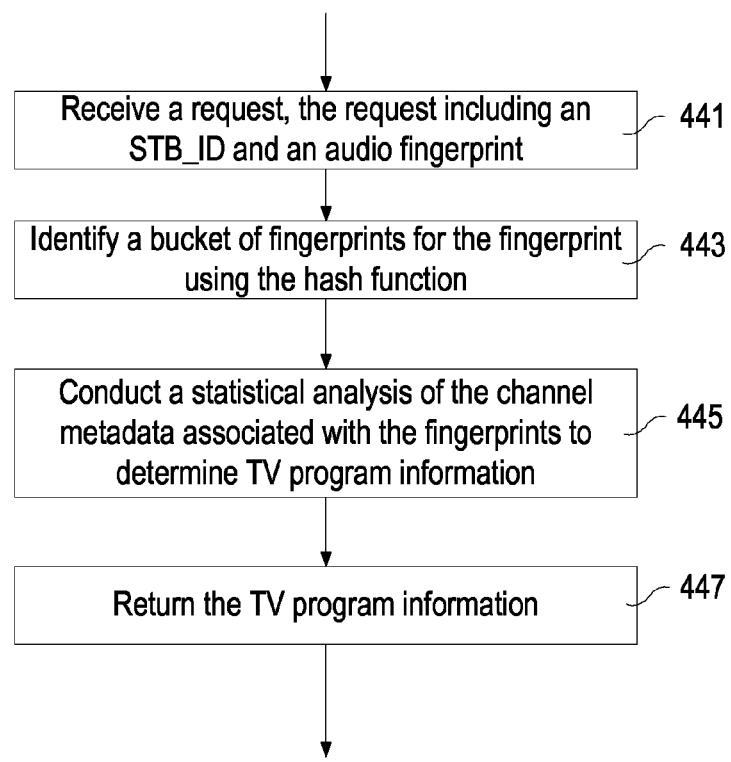
FIG. 4C is a flow chart illustrating how the TV content recognition server provides TV program information in response to a search query including an audio fingerprint in accordance with some implementations.

FIG. 4C is a flow chart illustrating how the TV content recognition server 150 provides TV program information in response to a search query including an audio fingerprint in accordance with some implementations. Here, it is assumed that the audio fingerprint is generated by a set top box that is playing a live TV program. As shown in the figure, the TV content recognition server 150 first receives (441) a request from the set top box and the request may include an audio fingerprint and optionally a STB_ID. The parameter STB_ID identifies the source of the request to which the TV content recognition server 150 will return a response including the information requested by an end user (which may be another TV application). Based on the received audio fingerprint, the TV content recognition server 150 identifies (443) a bucket of audio fingerprints using the hash function. In some implementations, this process is substantially the same as the process of inserting an audio fingerprint into a bucket, e.g., by measuring the distance between the received audio fingerprint and the center of a cluster of audio fingerprints in a respective bucket. After identifying the bucket of fingerprints, the TV content recognition server 150 conducts (445) a statistical analysis of the channel metadata associated with the audio fingerprints to determine the corresponding TV program information and returns (447) the TV program information to the end user. In some implementations, the returned TV program information includes channel name, program name, program rating, program synopsis, URL of the program on the Internet, etc As noted above, some set top boxes do not have access to the information about the TV program it is currently playing. For such set top box, it simply passes a video stream and an audio stream to the TV without understanding the content of the video and audio streams. In this case, an end user has to send a search query including an audio fingerprint to the TV content recognition server 150 and asks the TV content recognition server 150 to help determine what TV program the video and audio streams correspond to. The TV content recognition server 150 performs at least two functions. First, it will find a bucket of audio fingerprints that are the same or similar to the incoming audio fingerprint, which indicates that the audio fingerprints in the same bucket are from the same TV program. Some of the set top boxes can provide their channel metadata together with the audio fingerprints, or alternatively, it is possible to infer the channel metadata based on viewer actions. Therefore, the other function performed by the TV content recognition server 150 is to determine the TV program information based on the channel metadata associated with other audio fingerprints in the same bucket.

In some implementations, the statistical analysis is to find out the consensus among the channel metadata provided by different set top boxes. For example, if 20 set top boxes have provided channel metadata and the channel metadata from 15 out of the 20 set top boxes indicates that the TV program corresponding to the audio fingerprint is program A and the channel metadata from the other five set top boxes indicates that the TV program corresponding to the audio fingerprint is program B, it is more likely that the TV program being queried by the end user is also program A. This is partly because that the process of generating audio fingerprints from audio signals and the process of matching between an audio fingerprint and a bucket of audio fingerprints both may introduce errors to the final outcome. Therefore, a statistical analysis of the channel metadata can reduce the likelihood of returning the wrong TV program information to the end user.

Figure 5A:
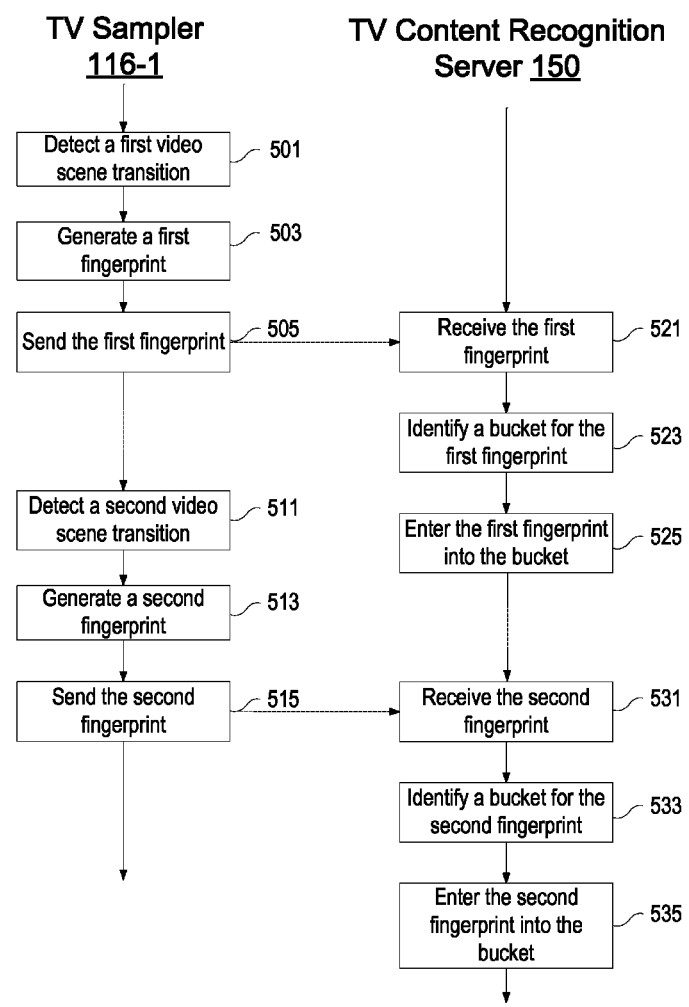
FIG. 5A is a flow chart illustrating how the set top box sends audio fingerprints to the TV content recognition server in accordance with some implementations.

FIG. 5A is a flow chart illustrating how a set top box (more specifically, a TV sampler 116-1) sends audio fingerprints to the TV content recognition server 150 in accordance with some implementations. The TV sampler 116-1 detects (501) a first video scene transition, generates (503) a first audio fingerprint, and sends (505) the first audio fingerprint to the TV content recognition server 150. Upon receipt of the first audio fingerprint (521), the TV content recognition server 150 identifies a bucket for the first audio fingerprint (523) and enters the first audio fingerprint into the bucket (525). Subsequently, the TV sampler 116-1 and the TV content recognition server 150 repeat the processes (511, 513, 515) and (531, 533, 535), respectively, in connection with the second audio fingerprint.

Figure 5B:
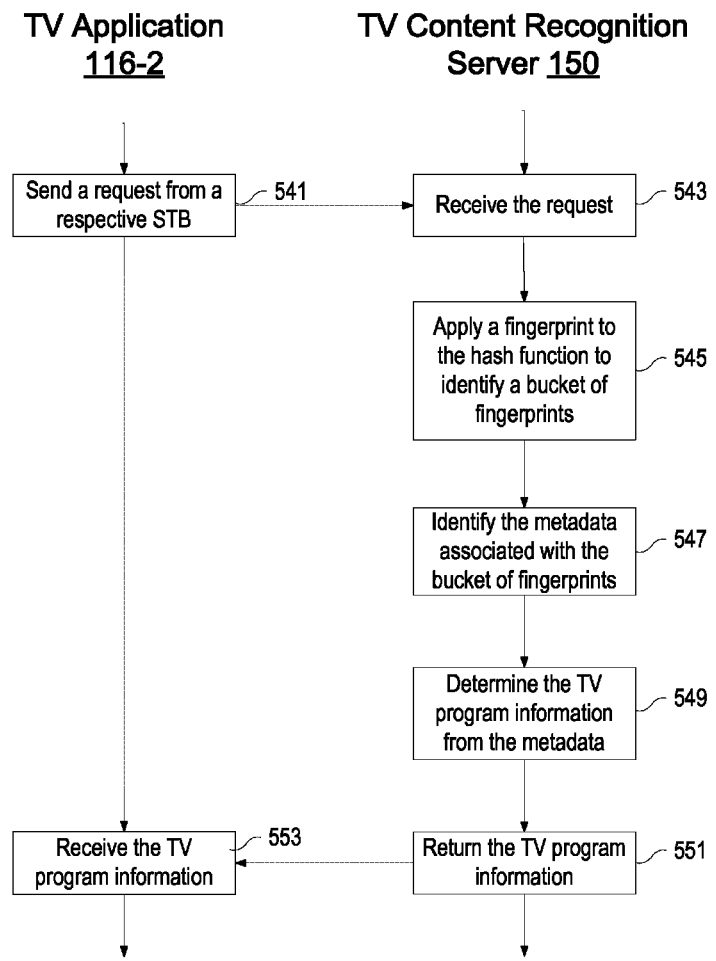
FIG. 5B is a flow chart illustrating how the set top box sends a search request including an audio fingerprint to the TV content recognition server and receives the TV program information from the TV content recognition server in accordance with some implementations.

FIG. 5B is a flow chart illustrating how the set top box (more specifically, a TV application 116-2) sends a search request including an audio fingerprint to the TV content recognition server 150 and receives the TV program information from the TV content recognition server in accordance with some implementations. The TV application 116-2 (541) sends a request to the TV content recognition server 150. After receiving the request (543), the TV content recognition server 150 applies (545) the audio fingerprint in the request to the hash function to identify a bucket of audio fingerprints and identifies (547) the channel metadata associated with the bucket of audio fingerprints. Next, the TV content recognition server 150 performs a statistical analysis to the channel metadata to determine the TV program information (549) and returns (551) the TV program information to the requesting TV application 116-2. The TV application 116-2 then uses the TV program information to perform a predefined function (e.g., generating a new TV viewership history record in the database).

In some implementations, the TV content recognition server 150 identifies a plurality of set top boxes as being associated with the identified bucket of audio fingerprints, prepares statistical TV viewership information based on the identified plurality of set top boxes, and returns the TV viewership information associated with the identified plurality of set top boxes to a client such as a TV viewership survey agency.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. For example, it is possible for the set top box to send raw audio signal to the TV content recognition server, which is then responsible for converting the audio signal into audio fingerprints. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method, comprising:
at a computer server system including one or more processors and memory:
receiving information associated with TV programs from a plurality of set top boxes, wherein the TV programs have associated audio signals and video signals, wherein the information includes audio fingerprints generated from the audio signals of TV programs captured at the plurality of set top boxes and channel metadata associated with at least a subset of the audio fingerprints, and wherein the information includes a respective video scene transition type for at least a plurality of the audio fingerprints;
partitioning the audio fingerprints into multiple groups such that audio fingerprints within a respective group correspond to a same respective TV program and correspond to a same video scene transition type;
receiving a query for TV program information from a set top box, wherein the query includes an audio fingerprint and an associated video scene transition type generated at the set top box;
comparing the audio fingerprint with the multiple groups of audio fingerprints to identify a group of audio fingerprints whose difference from the audio fingerprint is less than a predefined threshold, wherein the video scene transition type associated with the audio fingerprint matches the video scene transition type corresponding to the identified group of audio fingerprints;
identifying a subset of audio fingerprints from the identified group, wherein the subset includes a plurality of audio fingerprints and each audio fingerprint in the identified subset has associated channel metadata received from the set top boxes;

determining TV program information for the audio fingerprint based on a consensus among the channel metadata received from the set top boxes for the audio fingerprints in the identified subset; and returning the TV program information to the requesting set top box.

2. The computer-implemented method of claim 1, wherein the channel metadata includes channel lineup ID and channel number.

3. The computer-implemented method of claim 1, wherein the returned TV program information includes one or more of channel name, program name, program rating, program synopsis, and URL of the program on the Internet.

4. The computer-implemented method of claim 1, wherein an audio fingerprint is generated from an audio signal played at a set top box while identifying a video scene transition type in a video signal concurrently played at the set top box, and wherein the audio fingerprints are further partitioned into multiple groups such that audio fingerprints within a respective group correspond to a same respective TV program and corresponding video scene transition types are the same.

5. The computer-implemented method of claim 1, wherein the audio fingerprints are partitioned into multiple groups by applying a hash function to each audio fingerprint.

6. The computer-implemented method of claim 5, wherein the hash function is used for measuring a distance between an audio fingerprint and a center of a group of audio fingerprints such that the audio fingerprint is added to the group of audio fingerprints if the distance is less than a predefined threshold.

7. The computer-implemented method of claim 1, wherein the difference between the audio fingerprint and a group of audio fingerprints is computed as a distance between the audio fingerprint and a center of the group of audio fingerprints.

8. The computer-implemented method of claim 1, wherein determining TV program information for the audio fingerprint further includes:

using the consensus of the channel metadata to query a TV content provider database to determine the TV program information.

9. A computer server system for determining TV program information, comprising:

one or more processors;

memory; and a plurality of program modules, wherein the plurality of program modules are stored in the memory and to be executed by the one or more processors, and the plurality of program modules include instructions for:

receiving information associated with TV programs from a plurality of set top boxes, wherein the TV programs have associated audio signals and video signals, wherein the information includes audio fingerprints generated from the audio signals of TV programs captured at the plurality of set top boxes, and wherein the information includes a respective video scene transition type for at least a plurality of the audio fingerprints;

partitioning the audio fingerprints into multiple groups such that audio fingerprints within a respective group correspond to a same respective TV program and correspond to a same video scene transition type;

receiving a query for TV program information from a set top box, wherein the query includes an audio fingerprint and an associated video scene transition type generated at the set top box;

comparing the audio fingerprint with the multiple groups of audio fingerprints to identify a group of audio fingerprints whose difference from the audio fingerprint is less than a predefined threshold, wherein the video scene transition type associated with the audio fingerprint matches the video scene transition type corresponding to the identified group of audio fingerprints;

identifying a subset of audio fingerprints from the identified group, wherein the subset includes a plurality of audio fingerprints and each audio fingerprint in the identified subset has associated channel metadata received from the set top boxes;

determining TV program information for the audio fingerprint based on a consensus among the channel metadata received from the set top boxes for the audio fingerprints in the identified subset; and returning the TV program information to the requesting set top box.

10. The computer server system of claim 9, wherein the channel metadata includes channel lineup ID and channel number.

11. The computer server system of claim 9, wherein the returned TV program information includes one or more of channel name, program name, program rating, program synopsis, and URL of the program on the Internet.

12. The computer server system of claim 9, wherein an audio fingerprint is generated from an audio signal played at a set top box while identifying a video scene transition type in a video signal concurrently played at the set top box, and wherein the audio fingerprints are further partitioned into multiple groups such that audio fingerprints within a respective group correspond to a same respective TV program and corresponding video scene transition types are the same.

13. The computer server system of claim 9, wherein the audio fingerprints are partitioned into multiple groups by applying a hash function to each audio fingerprint.

14. The computer server system of claim 13, wherein the hash function is used for measuring a distance between an audio fingerprint and a center of a group of audio fingerprints such that the audio fingerprint is added to the group of audio fingerprints if the distance is less than a predefined threshold.

15. The computer server system of claim 9, wherein the difference between the audio fingerprint and a group of audio fingerprints is computed as a distance between the audio fingerprint and a center of the group of audio fingerprints.

16. The computer server system of claim 9, wherein the instructions for determining TV program information for the audio fingerprint further include instructions for:

using the consensus of the channel metadata to query a TV content provider database to determine the TV program information.

17. A non-transitory computer readable storage medium storing one or more program modules configured for execution by a computer server system that includes one or more processors and memory for determining TV program information, the one or more programs comprising instructions for:

receiving information associated with TV programs from a plurality of set top boxes, wherein the TV programs have associated audio signals and video signals, wherein the information includes audio fingerprints generated from the audio signals of TV programs captured at the plurality of set top boxes, and wherein the information includes a respective video scene transition type for at least a plurality of the audio fingerprints;

partitioning the audio fingerprints into multiple groups such that audio fingerprints within a respective group correspond to a same respective TV program and correspond to a same video scene transition type;

receiving a query for TV program information from a set top box, wherein the query includes an audio fingerprint and an associated video scene transition type generated at the set top box;

comparing the audio fingerprint with the multiple groups of audio fingerprints to identify a group of audio fingerprints whose difference from the audio fingerprint is less than a predefined threshold, wherein the video scene transition type associated with the audio fingerprint matches the video scene transition type corresponding to the identified group of audio fingerprints;

identifying a subset of audio fingerprints from the identified group, wherein the subset includes a plurality of audio fingerprints and each audio fingerprint in the identified subset has associated channel metadata received from the set top boxes;

determining TV program information for the audio fingerprint based on a consensus among the channel metadata received from the set top boxes for the audio fingerprints in the identified subset; and returning the TV program information to the requesting set top box.

18. The non-transitory computer readable storage medium of claim 17, wherein the channel metadata includes channel lineup ID and channel number.

19. The non-transitory computer readable storage medium of claim 17, wherein the returned TV program information includes one or more of channel name, program name, program rating, program synopsis, and URL of the program on the Internet.

20. The non-transitory computer readable storage medium of claim 17, wherein an audio fingerprint is generated from an audio signal played at a set top box while identifying a video scene transition type in a video signal concurrently played at the set top box, and wherein the audio fingerprints are further partitioned into multiple groups such that audio fingerprints within a respective group correspond to a same respective TV program and corresponding video scene transition types are the same.

21. The non-transitory computer readable storage medium of claim 17, wherein the audio fingerprints are partitioned into multiple groups by applying a hash function to each audio fingerprint.

22. The non-transitory computer readable storage medium of claim 21, wherein the hash function is used for measuring a distance between an audio fingerprint and a center of a group of audio fingerprints such that the audio fingerprint is added to the group of audio fingerprints if the distance is less than a predefined threshold.

23. The non-transitory computer readable storage medium of claim 17, wherein the difference between the audio fingerprint and a group of audio fingerprints is computed as a distance between the audio fingerprint and a center of the group of audio fingerprints.

24. The non-transitory computer readable storage medium of claim 17, wherein the instructions for determining TV program information for the audio fingerprint further include instructions for:

using the consensus of the channel metadata to query a TV content provider database to determine the TV program information.

25. A computer-implemented method, comprising:

at a computer server system including one or more processors and memory:

receiving information associated with TV programs from a plurality of set top boxes, wherein the TV programs have associated audio signals and video signals and the information includes audio fingerprints generated from the audio signals of a respective TV program captured at the plurality of set top boxes and channel metadata associated with at least a subset of the audio fingerprints and video scene transition types associated with at least a plurality of the audio fingerprints;

partitioning the audio fingerprints into multiple groups such that audio fingerprints within a respective group correspond to a same respective TV program and the corresponding video scene transition types are the same;

in response to a query from a client:

identifying one or more groups of audio fingerprints responsive to the query;

preparing statistical TV viewership information in accordance with, at least in part, the identified groups of audio fingerprints, the corresponding video scene transition type, and channel metadata associated with the identified groups of audio fingerprints, based on a consensus among the channel metadata received from the set top boxes for the audio fingerprints in the identified one or more groups; and returning the statistical TV viewership information to the requesting client.

26. The computer-implemented method of claim 25, wherein the client is a TV viewership survey agency.

* * * * *